(12) United States Patent
Schwarz et al.

(10) Patent No.: US 8,157,214 B2
(45) Date of Patent: Apr. 17, 2012

(54) AIRCRAFT WINDOW DARKENING SYSTEM

(75) Inventors: Alexander Schwarz, Laupheim (DE); Oleg Graf, Illertissen (DE)

(73) Assignee: Airbus Deutschland GmbH, Hamburg (DE)

( * ) Notice: Subject to any disclaimer, the term of this patent is extended or adjusted under 35 U.S.C. 154(b) by 1105 days.

(21) Appl. No.: 12/028,072

(22) Filed: Feb. 8, 2008

(65) Prior Publication Data

US 2008/0190568 A1 Aug. 14, 2008

Related U.S. Application Data

(60) Provisional application No. 60/889,061, filed on Feb. 9, 2007.

(30) Foreign Application Priority Data

Feb. 9, 2007 (DE) .......................... 10 2007 006 540

(51) Int. Cl.
*B64C 1/14* (2006.01)
(52) U.S. Cl. ..................................... 244/129.3
(58) Field of Classification Search ............... 244/129.3; 318/445; 160/84.02, 90, 176.1 V, 309, 310
See application file for complete search history.

(56) References Cited

U.S. PATENT DOCUMENTS

| 3,691,686 | A | * | 9/1972 | Donegan ........................... 49/56 |
| 3,906,669 | A | * | 9/1975 | Vorguitch ....................... 49/372 |
| 4,825,921 | A | | 5/1989 | Rigter |
| 6,186,211 | B1 | | 2/2001 | Knowles |
| 6,915,988 | B2 | * | 7/2005 | Sanz et al. ................. 244/129.3 |
| 7,510,146 | B2 | * | 3/2009 | Golden ...................... 244/129.3 |
| 7,690,414 | B2 | * | 4/2010 | Knowles ......................... 160/90 |
| 2001/0000294 | A1 | * | 4/2001 | Kitamura ....................... 318/445 |
| 2008/0078877 | A1 | * | 4/2008 | Switzer et al. ............. 244/129.3 |

FOREIGN PATENT DOCUMENTS

| DE | 10019787 | 4/2000 |
| EP | 0893341 | 1/1999 |
| EP | 1600316 | 11/2005 |
| WO | 03106805 | 12/2003 |

* cited by examiner

*Primary Examiner* — Tien Dinh
(74) *Attorney, Agent, or Firm* — Wood, Herron & Evans, LLP

(57) ABSTRACT

An aircraft window darkening system includes a movable slide that darkens an aircraft window when in a closed position and does not darken the aircraft window when in an open position. The darkening system also includes a motor which is coupled to the slide in order to move the slide. The motor may be attached to a window frame of an aircraft window. The slide may have a handle for moving the slide. The motor may be disposed behind a region covered by a frame cover and behind a holding ring, so that the motor is accessible from the aircraft cabin when the holding ring is removed.

16 Claims, 4 Drawing Sheets

AIRCRAFT WINDOW DARKENING SYSTEM

This application claims priority to U.S. Provisional Patent Application No. 60/889,061, filed on Feb. 9, 2007; and/or German Patent Application No. 102007006540.1, filed on Feb. 9, 2007.

TECHNICAL FIELD

The invention relates to an electric aircraft window darkening system having a low weight and a small number of additional components compared with a manual aircraft window darkening system.

BACKGROUND

Manual aircraft window darkening systems are known in the prior art. They consist of a slide or similar part which is disposed internally in front of the aircraft window and has a handle which allows to move said slide in front of the cabin-side pane into a closed position or out of said closed position and into an open position.

During takeoff and landing, visibility through the window must not be concealed. In the case of a manual aircraft window darkening system, therefore, the flight attendants have to ensure that all the slides are in the open position. This requires a flight attendant having to check each window, whether the slide is located in the open position and, if necessary, having to open the slide manually or ask a passenger to open the slide manually. Manual checking and actuation of the slides is time-consuming, particularly in the case of a wide-body aircraft, and may be perceived as annoying by passengers.

One object of the invention is to provide an aircraft window darkening system which eliminates the aforesaid problems and requires as few additional components as possible.

SUMMARY OF THE INVENTION

According to the invention, this object is achieved by means of an aircraft window darkening system having a movable slide which is disposed in such a way that it darkens an aircraft window when in a closed position and unblocks it when in an open position, and having a motor which is coupled to said slide in order to move it. The motor can be controlled by operating keys or by commands transmitted via a network. If a command is transmitted, via a network, to a plurality of aircraft window darkening systems in an aircraft, a plurality of such systems can be opened or closed simultaneously.

The motor may be constructed in such a way that it can be disposed on a window frame of an aircraft window. In this aircraft window darkening system, the only additionally required components, compared to a manual aircraft window darkening system, are essentially a motor, a motor mounting, a power transmission to the slide and a control apparatus. This results in an aircraft window darkening system which is particularly light and also easy to design and install.

The slide may comprise a handle for moving it manually. In this way, the aircraft window darkening system can be actuated both by the motor and by the slide.

The motor may be disposed behind a region which is covered by a window cover, so that it is accessible from the cabin of the aircraft when said cover is removed. The motor can thus be replaced very easily in the event of a fault. The motor may also be disposed behind a region covered by the frame cover and behind a holding ring which fastens a cabin-side pane, so that said motor is accessible from the aircraft cabin when said holding ring is removed. In this embodiment, the motor can be replaced particularly easily.

The motor may be coupled to the slide via a frictionally engaged transmission. For example, the motor may drive a friction wheel which contacts the slide. Alternatively, the motor may be coupled to the slide via a form-fit transmission. Said motor may drive a gearwheel whose teeth mesh with recesses in the slide. Said recesses may be located on a border region of the slide. They may be constructed as apertures.

At least one shaft may be connected to the motor in order to transmit the torque of the motor to the slide. The shaft(s) may transmit the torque of the motor to the border region of said slide.

The aircraft window darkening system may comprise a control apparatus. Said control apparatus may be adapted to supply the motor with current in response to a first positioning command, in order to move the slide. The control apparatus may detect the current flowing through the motor and interrupt the flow of current through the motor if said current flowing trough the motor exceeds a threshold value. A increasing current flow through the motor indicates that the slide is hitting a stop or a mechanical resistance. The stop may be the fully open or fully closed position of the slide. The mechanical resistance may be, for example, a passenger's hand. When a current flow that exceeds a threshold value is detected, the driving current through the motor is interrupted. Consequently, said motor no longer exerts any force on the stop or against the mechanical resistance. As a result of the interruption of the driving current, the motor is protected against damage and the passenger against injury. Moreover, the aircraft window darkening system according to the invention does not require any position sensors, since the end position can be detected by means of an increased flow of current.

The control apparatus may be adapted to supply the motor with current in response to a second positioning command, in order to move the slide if the current flowing through the motor no longer exceeds the threshold value. After reaching a stop, the slide may be moved away from the stop, for example in order to reopen a closed slide. Moreover, the slide may be moved in the desired direction again if it has encountered a mechanical resistance.

The control apparatus may be adapted to detect that a force is acting upon the slide in order to open or close it. Said control apparatus may cause a current flow through the motor, so that the latter moves the slide in the direction of the force which is acting upon it. In this embodiment, the passenger merely has to start to push the slide slightly, and the motor moves the latter in the desired direction until it reaches its end position.

The aircraft window darkening system may comprise a receiving apparatus which is adapted to receive commands and issue a command to the motor to open or close the slide. Said receiving apparatus may be connected to a CAN (controller area network) bus or the like.

The invention also relates to an aircraft window arrangement having the above-described aircraft window darkening system and the above-described further developments. The slide may be disposed behind a frame cover.

The holding ring, which fastens the cabin-side pane to the window-frame or to a window funnel for example, may be disposed behind the slide. The motor may be disposed on and/or behind the window-frame. For a service engineer, the frame cover may be removable from the cabin. The frame cover may form the panelling of the window arrangement on the cabin side. The window-frame may be constructed so as to be removable from the window funnel or integral with the latter. Said window funnel essentially forms a tapering region between the cabin-side pane and an outer pane which is disposed in the fuselage of the aircraft. The motor may, for example, be disposed behind the window-frame on the window funnel.

The motor may be disposed on and/or behind that side of the window-frame which faces away from the cabin, and said window-frame may comprise an aperture so that the motor is accessible from the cabin. Since the motor is disposed on the window-frame, it is, on the one hand, attached in a rigid and stable manner, but since the window-frame has an aperture so that the motor is accessible from the cabin, said motor can, on the other hand, be easily replaced in the event of a defect.

The at least one shaft may be disposed on that side of the window-frame which faces away from the cabin. Said shaft may be disposed above the window funnel. This results in a particularly space-saving aircraft window arrangement. Other apertures, through which the driving wheels, for example gearwheels, for moving the slide protrude, may be present in the window hopper. As has been mentioned previously, the slide is located in front of the window-frame.

The aircraft window darkening system according to the invention and the aircraft window arrangement according to the invention are easy to retrofit, easy to install, easy to replace and easy to service. In particular, it is not necessary to remove a side wall of the cabin panelling in order to install or replace components of the aircraft window darkening system according to the invention and of the aircraft window arrangement according to the invention.

The invention also relates to a method of manufacturing an aircraft window darkening system, in which a motor is coupled to a movable slide which is disposed in such a way that it darkens an aircraft window when in a closed position and does not darken said window when in an open position. The method can be developed further, as has been mentioned previously in connection with the aircraft darkening system and with the aircraft window arrangement.

For example, said method may include the step of disposing the motor on a window-frame of the aircraft window. In this case, the motor may be disposed behind a region which is covered by a window cover, so that said motor is accessible from the aircraft cabin when said window cover is removed. The motor may also be disposed on that side of the window-frame which faces away from the cabin, and an aperture may be provided in said window-frame, so that the motor is accessible from the cabin.

The invention also relates to a method of controlling an aircraft window darkening system. A motor is supplied with current in response to a first positioning command, in order to move a slide. The current flowing through the motor is detected and the current flowing through the motor is interrupted if it exceeds a threshold value. It is to be understood, the method can be developed further, as has been mentioned previously in connection with the aircraft darkening system.

For example, the method of controlling an aircraft window darkening system may supply the motor with current in response to a second positioning command, in order to move the slide if the current flowing through the motor no longer exceeds the threshold value. This method may further detect a force which is acting upon the slide in order to open or close it. It is possible to cause a current flow through the motor, so that the latter moves the slide in the direction of the force which is acting upon the slide.

BRIEF DESCRIPTION OF THE DRAWINGS

The invention will now be described in a more detailed manner with reference to the appended drawings, in which.

DETAILED DESCRIPTION OF THE PREFERRED EMBODIMENT

Figure 1:
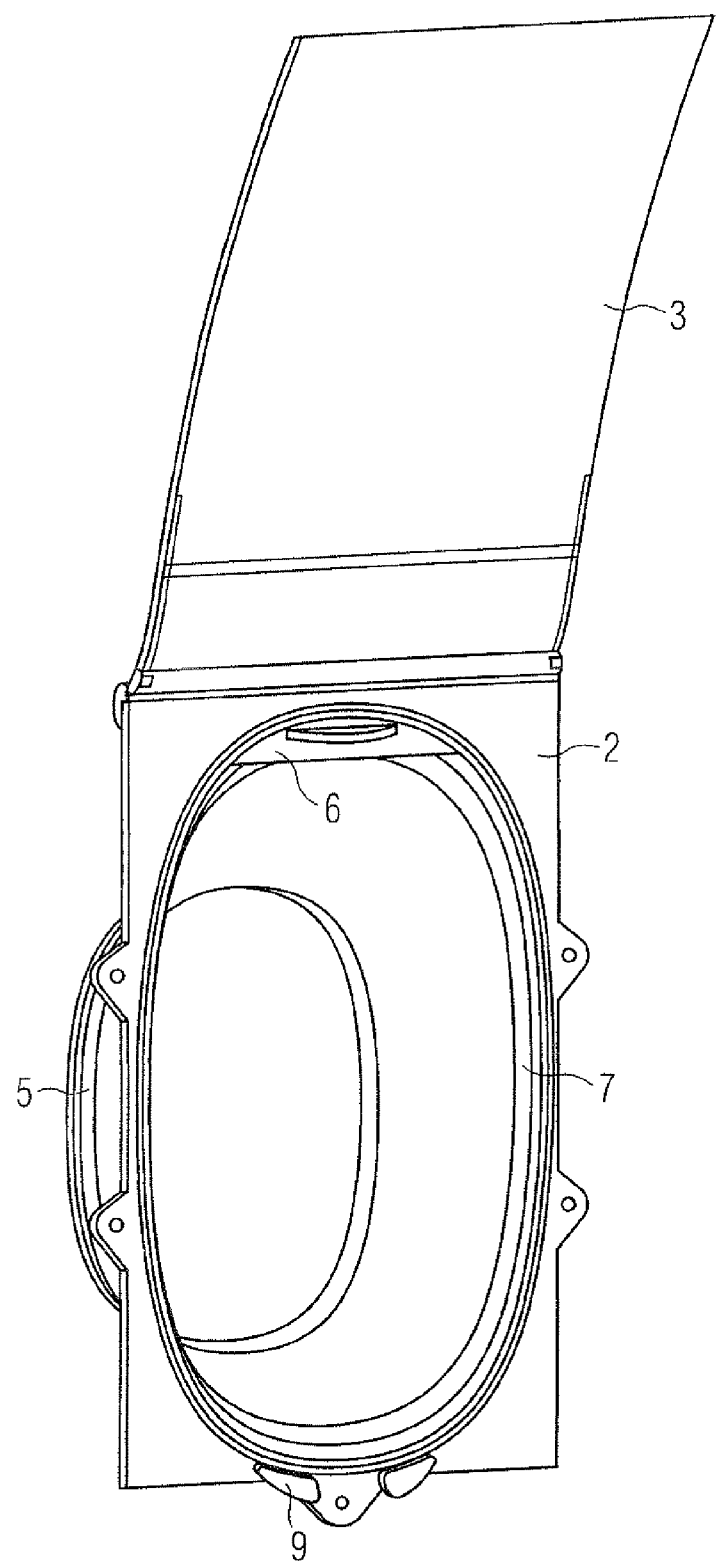
FIG. 1 shows the front side of an aircraft window arrangement according to the invention having an aircraft window darkening system according to the invention.

FIG. 1 shows a perspective front view of an aircraft window arrangement according to the invention. Said aircraft window arrangement comprises a window funnel 5 on which a holding ring 7 for securing a cabin-side window pane is disposed. Said window funnel 5 essentially extends from the side-wall panelling of the aircraft cabin to an outer pane on the aircraft. A frame cover 2 is disposed on the cabin-side end of the window funnel 5. Said frame cover 2 covers those components of the aircraft window arrangement which lie behind it, and also serves to adapt said aircraft window arrangement optically to a side wall of the cabin panelling of the aircraft.

The aircraft window arrangement also comprises a slide 3 having a handle 6. Said slide 3 is disposed behind the frame cover 2. FIG. 1 shows the open position of the slide 3. In its closed position, said slide 3 covers at least a region of the window funnel 5, so that no light can enter the cabin through this region.

Disposed in the lower region of the window-frame cover 2 are operating keys 9, by means of which a passenger or crew-member can move the slide 3 upwards or downwards. Said operating keys control a motor (not shown in FIG. 1) which moves the slide 3.

Figure 2:
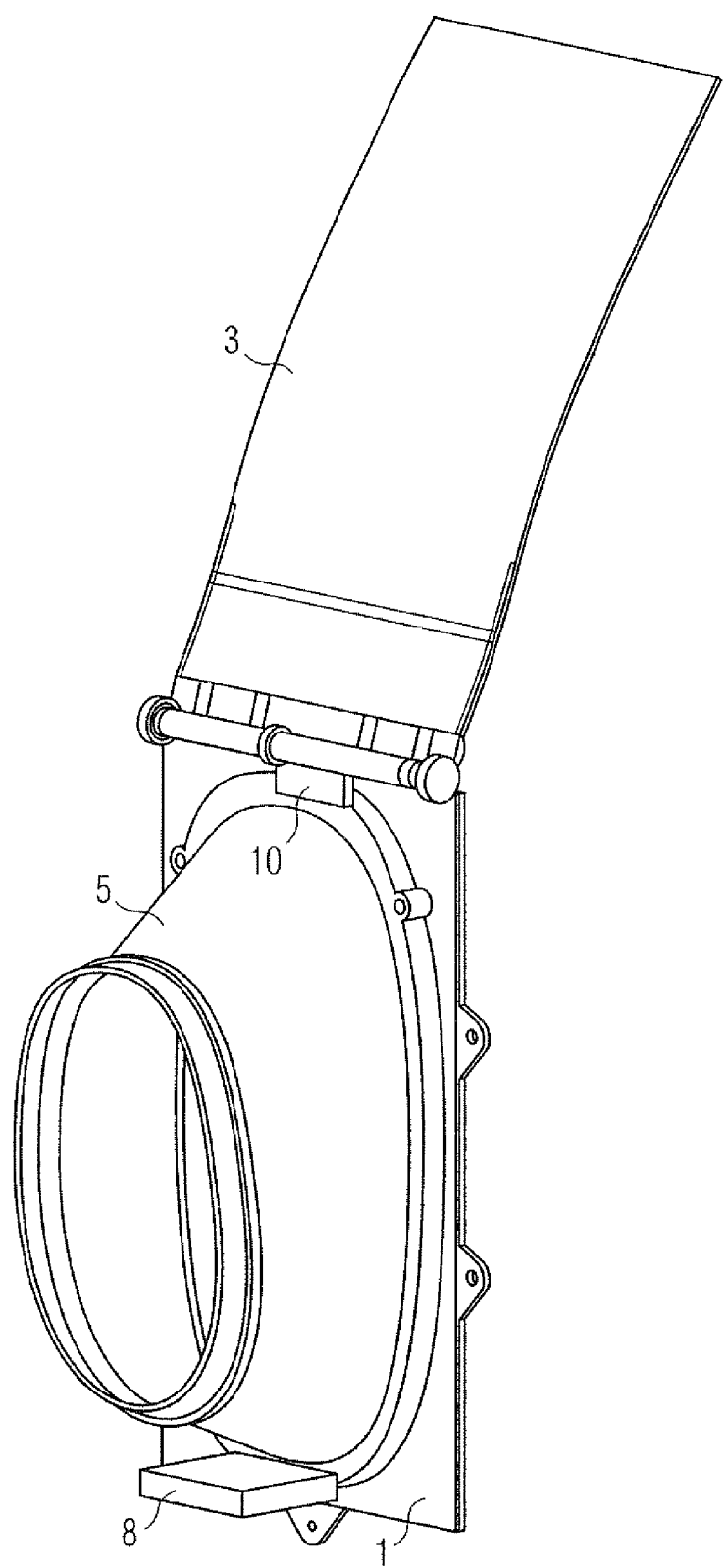
FIG. 2 shows the rear side of the aircraft window arrangement according to the invention having the aircraft window darkening system according to the invention.

FIG. 2 is a perspective view of the rear side of the aircraft window arrangement according to the invention. A window-frame 1 is disposed on the window funnel 5. The slide 3 is located on that side of said window-frame 1 which faces towards the cabin, A motor 10 is disposed on that side of the window-frame 1 which faces away from the cabin. Said motor 10 may also be disposed on the window funnel 5. The motor is controlled by an electronic control apparatus 8.

As has previously been mentioned, the control apparatus 8 may be adapted to supply the motor 10 with current in response to a first positioning command, in order to move the slide 3. Said control apparatus 8 is capable of detecting the current flowing through the motor 10 and of interrupting the current flow if said current flowing through the motor 10 exceeds a threshold value. An increasing current flow through the motor 10 indicates that the slide 3 is hitting a stop or a mechanical resistance. The stop may be the fully open or fully closed position of the slide 3. The mechanical resistance may be, for example, a passenger's hand. When a current flow that exceeds a threshold value is detected, the driving current flowing through the motor 10 is interrupted. Consequently, said motor 10 no longer exerts any force on the stop or against the mechanical resistance. As a result of the interruption of the driving current, the motor is protected against damage, and the passenger against injury. Moreover, the aircraft window darkening system according to the invention does not require any position sensors, since the end position can be detected by means of an increased flow of current. It is to be understood that a different embodiment of the invention may comprise at least one position sensor, in order to generate a position feedback.

The control apparatus 8 may be adapted to supply the motor 10 with current in response to a second positioning command, in order to move the slide 3 if the to current flowing through the motor 10 no longer exceeds the threshold value. After reaching a stop, the slide 3 may be moved away from the stop, for example in order to reopen the closed slide 3. Moreover, said slide 3 may be moved in the desired direction again if it has hit a mechanical resistance.

The control apparatus 8 may be adapted to detect that a force is acting upon the slide 3 in order to open or close it. Said control apparatus 8 may cause a current flow through the motor 10, so that the latter moves the slide 3 in the direction of the force which is acting upon it. In this embodiment, the passenger merely has to touch the slide 3 lightly and the motor moves the latter in the desired direction while said passenger is exerting a (small) force on said slide. The slide seems to the passenger to be particularly smooth running, since he has to expend only a little force in order to move it.

The aircraft window darkening system may comprise a receiving apparatus (not shown) which is adapted to receive commands and issue a command to the motor 10 to open or close the slide. Said receiving apparatus may be connected to a CAN bus or the like. The receiving apparatus is capable of enabling or disabling the operation keys 9.

Figure 3:
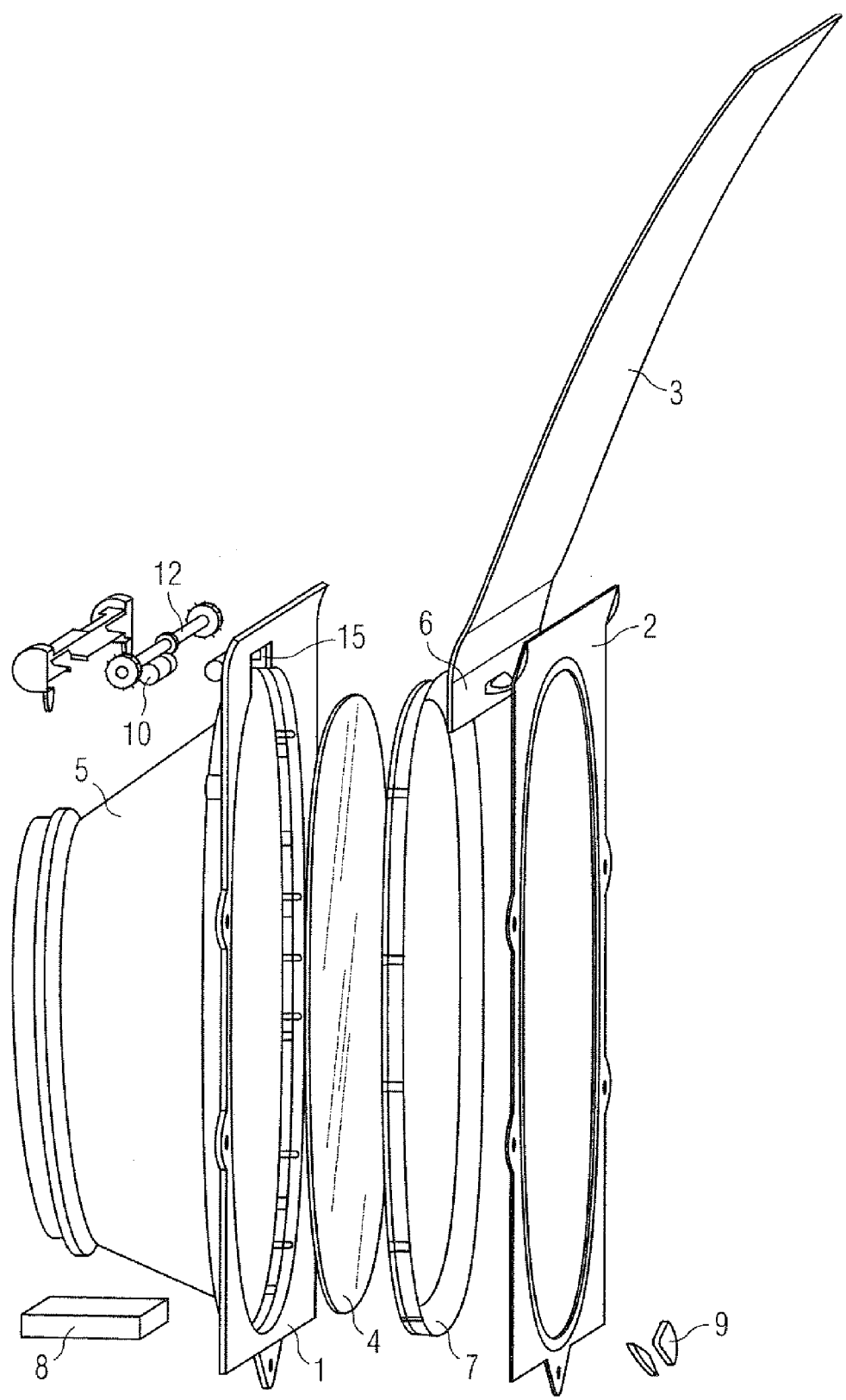
FIG. 3 shows an exploded view of the aircraft window arrangement according to the invention having the aircraft window darkening system according to the invention.

FIG. 3 is an exploded view of the aircraft window arrangement having the aircraft window darkening system. The electronic control apparatus 8 and the window-frame 1 are disposed on the window funnel 5. Said window-frame 1 may be removable from the window funnel 5 or be formed integral with the latter. The motor 10 is disposed, together with a drive shaft 12, on that side of the window-frame 1 which faces away from the cabin. A holding ring 7 holds the cabin-side pane 4 in the window funnel 5. Said holding ring 7 may, for example, latch into said window funnel 5. The slide 3 is disposed, together with the handle 6, in front of the cabin-side side pane 4 and the holding ring 7. The frame cover 2 is provided in front of said slide 3.

The motor 10 can be easily replaced in the event of a failure. To do so, it is merely necessary to remove the holding ring 7, and the slide 3 should be located in the upper position. For this purpose, it may be necessary to take off the holding ring 7 and the cabin-side pane 4. An aperture 15, which allows access to the motor 10 located behind the window-frame 1, is formed in the window-frame 1. The defective motor 10 can be taken out through the aperture 15 in the window-frame 1, and a operational motor can be inserted through said aperture 15.

Figure 4:
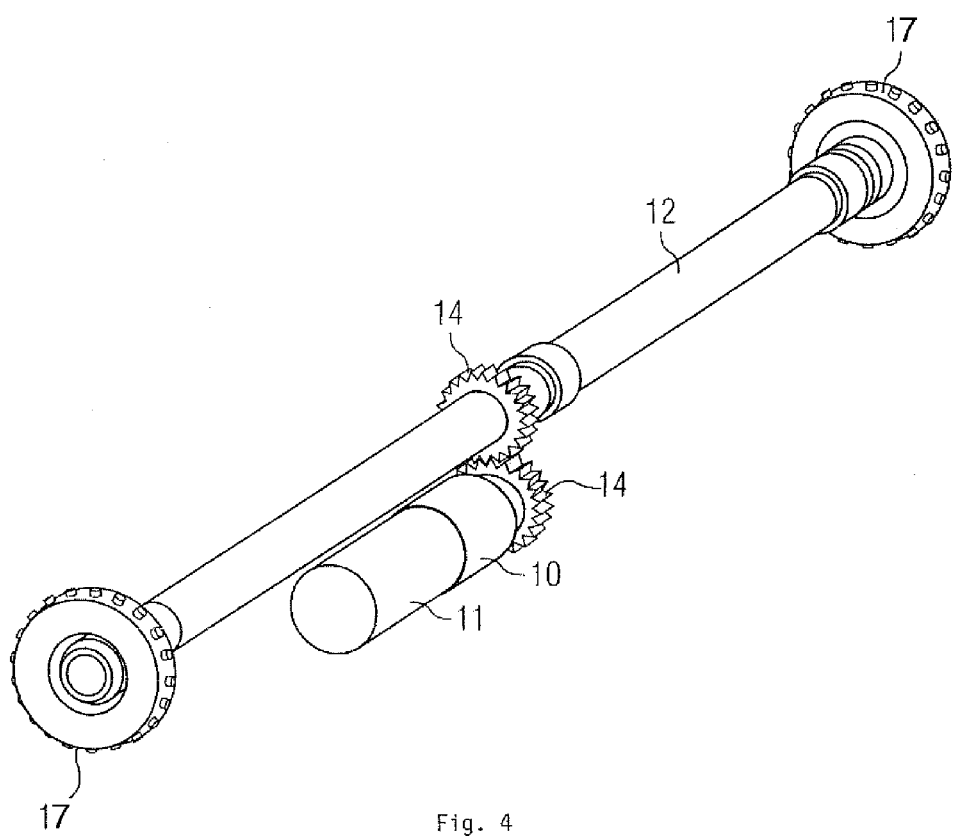
FIG. 4 shows a perspective view of a motor and shaft of the aircraft window darkening system according to the invention.

FIG. 4 shows the motor 10, together with an encoder 11. Said motor drives the shaft 12 via a pair of gearwheels 14. Said shaft 12 transmits the torque of the motor to border regions of the slide 3. There may be provided in the slide 3 recesses or apertures, for example, in which the teeth or spikes of a driving wheel 17 mesh. The shaft 12 may be disposed above the window funnel 5 in order to save space. It is to be understood that the shaft 12 may also be disposed below the window funnel 5 if the slide is moved downwards into the open position.

The aircraft window darkening system according to the invention and the aircraft window arrangement according to the invention are easy to retrofit, easy to install, easy to replace and easy to service. In particular, it is not necessary to remove a side wall of the cabin paneling in order to install or replace components of the aircraft window darkening system according to the invention and of the aircraft window arrangement according to the invention.

The invention claimed is:

1. An aircraft window darkening system, comprising:
    a frame cover configured to cover a region adjacent an aircraft window in a cabin, the aircraft window including a window frame and a cabin-side pane,
    a holding ring fastening the cabin-side pane to the window frame, the holding ring being insertable and removable through the frame cover,
    a movable slide that moves between a closed position in which the slide darkens the aircraft window and an open position in which the slide does not darken the aircraft window, and
    a motor which is coupled to the slide in order to move the slide, the motor being positioned behind the frame cover and behind the holding ring such that removal of the holding ring provides access to the motor from the cabin for maintenance or removal.

2. The aircraft window darkening system according to claim 1, wherein the motor is coupled to the window frame.

3. The aircraft window darkening system according to claim 1, wherein the slide includes a handle for moving the slide manually between the open position and the closed position.

4. The aircraft window darkening system according to claim 1, wherein the motor is coupled to the slide by a friction-fit power-transmitting apparatus.

5. The aircraft window darkening system according to claim 1, wherein the motor is coupled to the slide by a form-fit power-transmitting apparatus.

6. The aircraft window darkening system according to claim 1, further comprising:
    at least one shaft coupled to the motor and transmitting torque from the motor to the slide.

7. The aircraft window darkening system according to claim 1, further comprising:
    a control apparatus which is adapted to:
        supply the motor with current in response to a first positioning command, in order to move the slide;
        detect the current flowing through the motor; and
        interrupt the flow of current through the motor if the current flowing through the motor exceeds a threshold value.

8. The aircraft window darkening system according to claim 7, wherein the control apparatus is adapted to supply the motor with current in response to a second positioning command, in order to move the slide if the current flowing through said motor no longer exceeds the threshold value.

9. The aircraft window darkening system according to claim 7, wherein the control apparatus is adapted to:
    detect that a manual force is acting upon the slide to move the slide in a first direction; and
    cause a current flow through the motor so that the motor moves the slide in the first direction.

10. The aircraft window darkening system according to claim 1, further comprising:
    a receiving apparatus which is adapted to receive commands and issue a command to the motor in order to open or close the slide.

11. The aircraft window arrangement having an aircraft window darkening system according to claim 1, wherein:
    the slide is disposed behind the frame cover;
    the holding ring, which secures the cabin-side pane, is disposed behind the slide; and
    the motor is disposed on and/or behind a side of the window frame which faces away from the cabin.

12. The aircraft window arrangement according to claim 11, wherein the window frame comprises an aperture located adjacent to the cabin-side pane so that the motor is accessible from the cabin when the holding ring is removed.

13. The aircraft window arrangement according to claim 11, wherein at least one shaft is coupled to the motor and disposed on the side of the window-frame which faces away from the cabin.

14. A method of manufacturing an aircraft window darkening system for use with an aircraft window including a window frame and a cabin-side pane, said method comprising:
coupling a frame cover to the window frame, the frame cover being configured to cover a region adjacent the aircraft window in a cabin;
fastening the cabin-side pane to the window frame with a holding ring, the holding ring being insertable and removable through the frame cover; and
coupling a motor to a movable slide that moves between a closed position in which the slide darkens the aircraft window and an open position in which the slide does not darken the aircraft window, the motor operable to move the slide between the open and closed positions,
wherein the motor is positioned behind the frame cover and behind the holding ring such that removal of the holding ring provides access to the motor from the cabin for maintenance or removal.

15. The method according to claim 14, further comprising:
disposing the motor on the window frame of the aircraft window.

16. The method according to claim 15, further comprising:
disposing the motor on and/or behind a side of the window frame which faces away from the cabin; and
providing an aperture in the window frame adjacent to the cabin pane, so that the motor is accessible from the cabin when the holding ring is removed.

* * * * *